United States Patent [19]

Torii

[11] 4,368,915
[45] Jan. 18, 1983

[54] AUTOMOTIVE VEHICLE SUNROOF WATER DRAIN FITTING STRUCTURE

[75] Inventor: Hiromasa Torii, Koganei, Japan

[73] Assignee: Nissan Motor Company, Limited, Yokohama, Japan

[21] Appl. No.: 173,317

[22] Filed: Jul. 29, 1980

[30] Foreign Application Priority Data

Jul. 31, 1979 [JP] Japan .................. 54-106325[U]

[51] Int. Cl.³ .................................................. B60J 7/00
[52] U.S. Cl. ....................................... 296/213; 285/189
[58] Field of Search ......................... 296/213; 285/189

[56] References Cited

U.S. PATENT DOCUMENTS

| 2,991,120 | 7/1961 | Barenyi | 296/213 |
| 3,044,824 | 7/1962 | Werner | 296/213 |
| 3,972,558 | 8/1976 | Horn | 296/213 |
| 4,159,035 | 6/1979 | Chartet | 285/189 |
| 4,159,144 | 6/1979 | Ehlen | 296/137 F |

FOREIGN PATENT DOCUMENTS

| 1222274 | 6/1960 | France . | |
| 1404296 | 5/1965 | France | 296/213 |
| 2326304 | 4/1977 | France . | |
| 430479 | 6/1935 | United Kingdom . | |
| 970154 | 9/1964 | United Kingdom | 296/213 |
| 1131309 | 10/1968 | United Kingdom . | |

OTHER PUBLICATIONS

"Soldering Manual" (*American Welding Society*), First Edition, p. 47.
"Brazing Manual" (*American Welding Society*), Third Edition, Revised, pp. 73, 76.

*Primary Examiner*—Joseph F. Peters, Jr.
*Assistant Examiner*—John A. Carroll
*Attorney, Agent, or Firm*—Thompson, Birch, Gauthier & Samuels

[57] ABSTRACT

An improved automotive vehicle sunroof water drain fitting structure for use with a sunroof water drain container in bonded to mounting flanges formed in the container wall. The flanges define mounting surfaces having areas much larger than the thickness of the container wall, thereby improving the structural rigidity and water drain seal characteristics of the joint between the container wall and water drain fitting.

10 Claims, 7 Drawing Figures

AUTOMOTIVE VEHICLE SUNROOF WATER DRAIN FITTING STRUCTURE

BACKGROUND OF THE INVENTION

1. Field of the Invention

The present invention relates generally to an improved water drain fitting structure for an automotive vehicle sunroof water drain container, and more specifically to a water drain fitting that is attached to the container by flange sections formed within the container body.

2. Description of the Prior Art

Although it is well known to mount a water drain fitting within a vehicle sunroof water drain container wall either perpendicular or at a convenient angle thereto, heretofore water drain fittings have been retained in place only by the strength of the edges of the container material, thus subjecting the water drain fitting to leakage or structural failure at the union of the fitting and container wall. Due to this construction, such prior art water drain fittings had the additional drawback that the fitting necessarily extended into the interior of the container, thus forming a pocket thereabout to retain water in the drain and thereby prevent effective and complete draining thereof.

SUMMARY OF THE INVENTION

The improved water drain fitting structure of the present invention comprises a hollow, open-ended water drain fitting mounted in a thin-wall automotive vehicle sunroof water drain container, and attached thereto by flanges formed within the container wall. The lower flange joint is essentially even with the lower surface of the thin-wall container to effect complete draining of the water drain container.

DESCRIPTION OF THE PREFERRED EMBODIMENTS

Figure 1:
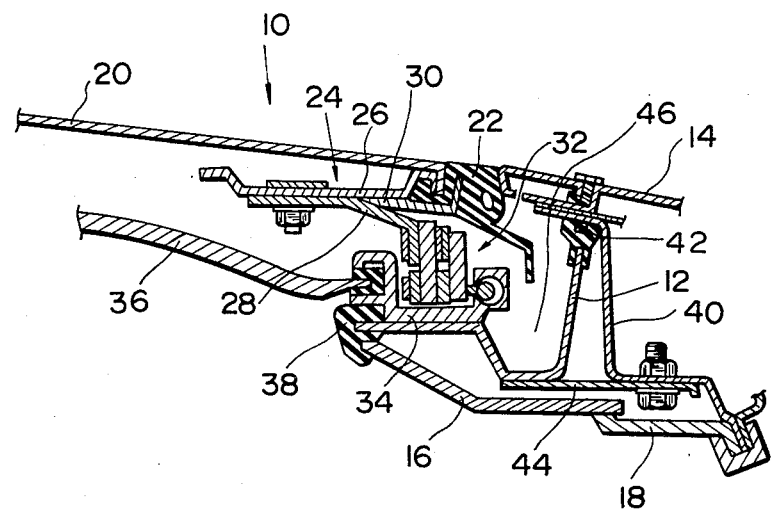
FIG. 1 is a vertical sectional view of a section of a typical automotive vehicle sunroof, showing the sliding mechanism associated therewith and a water drain container for use with the improved water drain fitting structure of the present invention.

The improved automotive vehicle sunroof water drain fitting structure of the present invention is shown in FIG. 1 in connection with a typical sunroof installation 10, comprising a sunroof frame 12 mounted to the vehicle roof 14. As shown, this frame 12 also forms the thin-wall water drain container for collecting water that leaks into the sunroof sliding mechanism. The vehicle interior lining 16 is connected to the sunroof frame 12 and to vehicle interior molding 18 in a conventional manner.

A vehicle sunroof 20 is shown having a rubber environmental seal 22 connected thereto, which seal engages the vehicle roof 14 to seal the sunroof sliding mechanism against the effects of the environment. The sunroof 20 is connected at the edge thereof to a sunroof support and sliding mechanism 24, which comprises an upper plate 26 (attached to the sunroof 20), a lower plate 28 and an environmental seal support plate 30.

The lower plate 28 also forms part of a sliding mechanism 22, along with a slide rail 34 attached to the sunroof frame 12, to enable opening and closing of the vehicle sunroof 20. An interior roof panel 36 is connected to the slide rail 34 in a conventional manner. An aesthetic and environmental seal 38 connects the sunroof frame 12 to the interior lining 16, also in a conventional manner.

A roof structural member 40 is connected to the sunroof frame 12 by a vibration insulator/mount 42 at the upper section of the sunroof frame, and by a lower mounting bracket 44 at the lower section thereof. As shown, the sunroof frame 12 defines a water drain container 46 for collecting water that leaks from the vehicle exterior around the rubber environmental seal 22.

Figure 2:
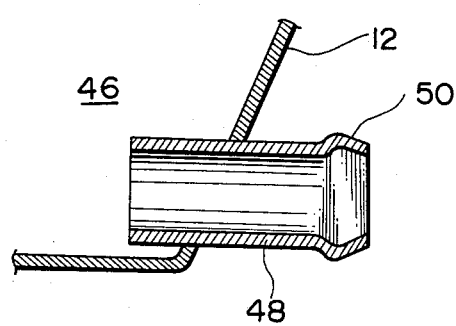
FIGS. 2 and 3 are vertical sectional views of conventional water drain fitting structures.
Figure 3:
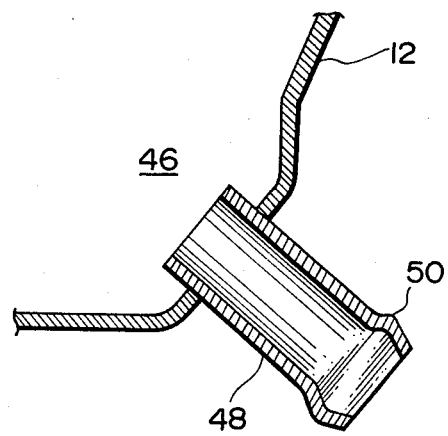

FIGS. 2 and 3 show examples of water drain fittings 48 attached to the sunroof frame 12 in conventional manners to form drain means therefor. These water drain fittings 48 include an annular tapered section 50 for retaining a rubber hose thereon for transferring the water collected within the container or vessel 46 conveniently from the sunroof sliding mechanism.

Figure 4:
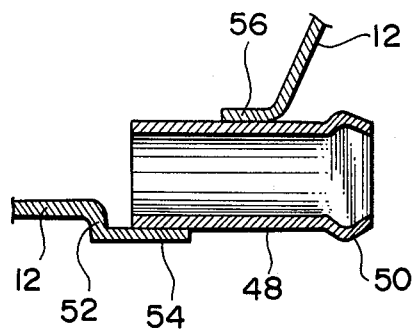
FIG. 4 is a vertical sectional view of the preferred embodiment of the improved sunroof water drain fitting structure of the present invention.

The improved automotive vehicle sunroof water drain fitting structure of the present invention comprises a conventional hollow, open-ended water drain fitting 48 mounted within the thin-wall water drain container 12 in a manner to give improved and additional support to the joint between the water drain fitting and the container wall. As shown in FIG. 4, the improved structure comprises a stepped section 52 formed with an essentially horizontal first section of the container wall 12 to define a lower attaching flange 54 when the mounting hole is formed in the container wall, as will be described hereinbelow. Forming the mounting hole also results in the formation of an upper attaching flange 56 formed with an essentially vertical wall of the container or vessel 12, by which the open-ended water drain fitting 48 is attached thereto, as shown in FIG. 4. It will be appreciated by those skilled in the art that the utilization of the upper and lower mounting flanges 56 and 54 results in an improved structural and water tight connection between the thin-wall container 12 and the water drain fitting 48.

The preferred embodiment shown in FIG. 4 also provides for the lower inner surface of the water drain fitting 48 to be positioned below, or at least even with, the lower interior surface of the container 12 to enable the container to be drained completely through the water drain fitting.

Those skilled in the art will readily appreciate that the water drain fitting 48 may be bonded to the thin-wall container 12 by any conventional means, as in dipbrazing, welding or the use of a chemical adhesive, resulting in a greatly improved water drain seal therebetween. The upper and lower flanges 56 and 54 provide additional support for the water drain fitting by providing a much greater bonding area between the thin-wall container and the water drain fitting than prior art devices utilizing only the thickness of the container wall as a bonding surface.

Figure 5:
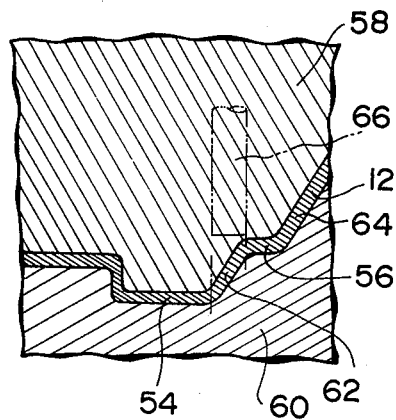
FIG. 5 is a vertical sectional view of the die and punch mechanism used in forming the thin-wall container section for use with the improved sunroof water drain fitting structure of the present invention.

FIG. 5 shows the configuration of a die and punch mechanism for forming the thin-wall sunroof water drain container and punching the hole for the water drain fitting in accordance with the present invention. An upper or male die 58 engages a lower or female die 60 to form the thin-wall container for use with the water drain fitting structure of the present invention. As shown, the water drain container 12 thus formed includes an essentially horizontal first section 54 (which forms the lower flange), a second section 62 formed therewith to define a "V" shaped cross-section, a third section 56 (which forms the upper flange) formed with the second section and parallel to the first section (lower flange), and a fourth section 64 formed with the third section essentially parallel to the second section. In this manner, when a mounting hole is formed in the container second section 62 to accept the water drain fitting in an orientation parallel to the bottom surface of the container 12, the first and third sections define the lower and upper flanges 54 and 56 to which the water drain fitting is mounted, resulting in the improved water drain fitting structure of the present invention.

The mounting hole may be punched in the thin-wall container 12 at the time of forming in the die mechanism by providing a punch mechanism 66 in the upper die 58 to punch the mounting hole when the upper and lower dies are in the closed position as shown in FIG. 5. The shape of the resulting mounting hole, as viewed along the axis of the water drain fitting, is dependent on the shape of the punch 66 and the angle of the plane of the container second section 62 with respect to the axis of travel of the punch. Obviously, any combination of punch shapes and formation angles of the container wall 12 may be employed.

Figure 6:
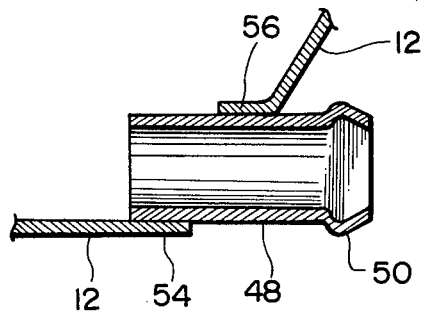
FIGS. 6 and 7 are alternative embodiments of the improved sunroof water drain fitting structure of the present invention.
Figure 7:
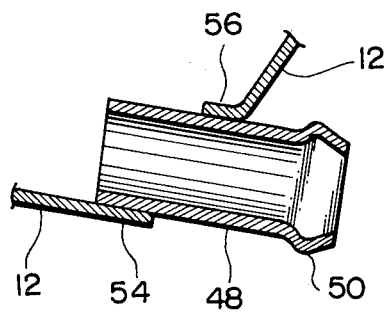

FIGS. 6 and 7 show alternative embodiments of the improved automotive vehicle sunroof water drain fitting structure of the present invention. Each of the devices shown includes the upper and lower mounting flanges 56 and 54, but does not include the stepped section 52 of the preferred embodiment shown in FIG. 4. However, due to the fact of bonding the water drain fitting to the lower attaching flange 54, the drain is located at the lowermost portion of the container 12 to effect complete draining of water from within.

There has been provided an improved automotive vehicle sunroof water drain fitting structure in accordance with the present invention that satisfies all of the aims and objectives set forth hereinabove. It should be understood that further modifications and variations may be made in the present invention without departing from the spirit of the present invention as set forth in the appended claims.

What is claimed is:

1. A drainage structure for an automotive vehicle sunroof assembly, comprising:
   (a) a water drain container extending around the sunroof assembly and having as integral parts thereof
      (1) an essentially horizontal first section defining the bottom of said container;
      (2) a second section parallel to and positioned above said first section; and
      (3) a third section connecting said first and second sections and having an opening therein;
   (b) and a hollow open-ended water drain fitting received in said opening and arranged in parallel relationship with said first and second sections, said first and second sections being spaced vertically one from the other so as to define lower and upper essentially horizontal flanges to which said drain fitting is fixedly secured at circumferentialy spaced lower and upper portions respectively, said lower and upper flanges respectively extending rigidly from the lower and upper ends of said opening to provide structural support for said drain fitting.

2. A drainage structure for an automotive vehicle sunroof assembly as set forth in claim 1, wherein said first section is stepped downwardly so that the inner surface of the lower end of said water drain fitting forms a plane with the upper surface of said first section.

3. A drainage structure for an automotive vehicle sunroof assembly as set forth in claim 1, wherein said first section is stepped downwardly so that the inner surface of the lower end of said water drain fitting is below a plane defined by the upper surface of said first section.

4. A drainage structure for an automotive vehicle sunroof assembly as set forth in claim 1, wherein said first section is inclined downwardly toward said third section.

5. A drainage structure for an automotive vehicle sunroof assembly as set forth in claims 1, 2, 3 or 4, wherein said water drain fitting is of a cylindrical shape.

6. A drainage structure for an automotive vehicle sunroof assembly as set forth in claim 5, wherein said water drain fitting includes an annular tapered section formed at the end thereof opposite the attachment of said container.

7. A drainage structure for an automotive vehicle sunroof assembly, comprising:
   (a) a water drain container extending around the sunroof assembly and having as integral parts thereof
      (1) an essentially horizontal first section defining the bottom of said container;
      (2) a second section parallel to and positioned above said first section; and
      (3) a third section connecting said first and second sections and having an opening therein, said third section being inclined outwardly with respect to the center of the sunroof assembly toward said second section;
   (b) and a hollow open-ended water drain fitting received in said opening and arranged in parallel relationship with said first and second sections, said first and second sections being spaced vertically one from the other so as to define lower and upper essentially horizontal rigid flanges structurally supporting said drain fitting, said flanges being fixedly secured to circumferentially spaced lower and upper portions respectively of said drain fitting, said lower flange extending inwardly toward the center of the sunroof assembly from the lower end of said opening, said upper flange extending outwardly with respect to the center of the sunroof assembly from the upper end of said opening.

8. A drainage structure for an automotive vehicle sunroof assembly as set forth in claim 7, wherein said first section is stepped downwardly so that the inner surface of the lower end of said water drain fitting lies at approximately the plane of the upper surface of said first section.

9. A drainage structure for an automotive vehicle sunroof assembly as set forth in claim 7, wherein said first section is stepped downwardly so that the inner surface of the lower end of said water drain fitting lies below the upper surface of said first section.

10. A drainage structure for an automotive vehicle sunroof assembly as set forth in claim 9, wherein said first section is inclined downwardly toward said third section.

* * * * *